United States Patent
Ito et al.

(10) Patent No.: US 6,321,213 B1
(45) Date of Patent: Nov. 20, 2001

(54) ELECTRONIC MONEY PROCESSING METHOD HAVING A TRANSACTION FEE COLLECTING FUNCTION AND AN ELECTRONIC MONEY STORAGE APPARATUS FOR THE SAME

(75) Inventors: Atsushi Ito, Tokyo; Masaaki Hiroya; Takeshi Teramura, both of Yokohama; Akira Muramatsu, Kawasaki; Yoshiaki Kawatsura, Yokohama, all of (JP)

(73) Assignee: Hitachi, Ltd., Tokyo (JP)

(*) Notice: Subject to any disclaimer, the term of this patent is extended or adjusted under 35 U.S.C. 154(b) by 0 days.

(21) Appl. No.: 09/259,335

(22) Filed: Mar. 1, 1999

(30) Foreign Application Priority Data

Mar. 3, 1998 (JP) .................................. 10-067896

(51) Int. Cl.$^7$ ................................................ G06F 17/60
(52) U.S. Cl. ............................ 705/39; 705/41; 235/380; 235/379; 902/22
(58) Field of Search ................................ 705/39, 41, 42, 705/43; 235/380, 381, 379, 375; 902/22, 26

(56) References Cited

U.S. PATENT DOCUMENTS

| | | | |
|---|---|---|---|
| 4,032,931 | * 6/1977 | Haker | 340/365 |
| 4,305,059 | * 12/1981 | Benton | 340/825.33 |
| 4,320,387 | * 3/1982 | Powell | 340/825.34 |
| 4,454,414 | * 6/1984 | Benton | 235/379 |
| 4,549,075 | * 10/1985 | Saada et al. | 235/380 |
| 4,669,730 | * 6/1987 | Small | 273/138 |
| 4,877,947 | * 10/1989 | Mori | 235/381 |
| 5,221,838 | * 6/1993 | Gutman et al. | 235/379 |
| 5,461,217 | * 10/1995 | Claus | 235/380 |
| 5,854,581 | * 12/1998 | Mori et al. | 235/379 |
| 6,065,675 | * 6/1998 | Teicher | 235/380 |
| 6,189,782 | * 2/2001 | Takami et al. | 235/375 |

FOREIGN PATENT DOCUMENTS

| | | |
|---|---|---|
| 0940784 A | * 9/1999 | (EP) . |
| 358112167 | * 7/1983 | (JP) . |
| 358115577 | * 7/1983 | (JP) . |
| 402017597 | * 1/1990 | (JP) . |
| 9-128465 | 5/1997 | (JP) . |
| WO91/16691 | 10/1991 | (WO) . |
| WO 81/02070 | * 9/1999 | (WO) . |
| WO 00/22556 | * 4/2000 | (WO) . |

OTHER PUBLICATIONS

Scientific American, Aug. 1992, pp. 96–101.

Illustrated Guide to Electronic Money of Financial System Promoting Division of Hitachi, Nikkan Kogyo Shimbun, Jun. 1996, pp. 124–127.

"What price will consumers and Merchants pay for Modex" Anonymous; Bank Network News, Chicago; vol. 15, No. 19; p. 3, 1 pgs, Feb. 1997.*

* cited by examiner

Primary Examiner—Vincent Millin
Assistant Examiner—Daniel S Felten
(74) Attorney, Agent, or Firm—Mattingly, Stanger & Malur, P.C.

(57) ABSTRACT

An electronic money storage apparatus includes that an amount of remittance p is determined on a remitting side and a receiving side. A remitting apparatus obtains a remitter's transaction fee x and an amount y to be stored in a transaction fee storage area. The remitting apparatus obtains a sum of p and x, i.e., p+x from an electronic money storage area, divides the sum into an amount y to be stored on the remitting side and an amount remained p+x−y, stores y in a transaction fee storage area, and sends p+x −y to the receiving side. A receiving apparatus obtains a receiver's transaction fee z and an amount u to be stored in a transaction fee storage area, receives p+x−y, divides p+x−y into u to be stored on the receiving side and p−z, stores u in a transaction fee storage area, and stores remaining electronic money p−z in an electronic money storage area, thereby the transaction fee can be collected while retaining anonymity between the remitter and the receiver and usability of electronic money in the processing of electronic money by use of an IC card or the like.

9 Claims, 5 Drawing Sheets

ELECTRONIC MONEY PROCESSING METHOD HAVING A TRANSACTION FEE COLLECTING FUNCTION AND AN ELECTRONIC MONEY STORAGE APPARATUS FOR THE SAME

BACKGROUND OF THE INVENTION

The present invention relates to processing of electronic money using a dedicated media such as an IC card or a smart card, and in particular, to an electronic money processing method and an electronic money storage apparatus which makes it possible to automatically collect, in a remittance or transfer of money from a remitter to a remittee or a receiver, a commission or a transaction fee without any third person other than the remitter and the receiver.

Heretofore, there has been actually implemented the processing of electronic money using a dedicated media such as an IC card, for example, a balance managing type described in JP-A-5-504643 and a token type described in JP-A-9-128465.

First, description will be given of the electronic money of the balance managing type of JP-A-5-504643.

The remitter is assigned with an electronic money storage apparatus which keeps a shared public key Kpg, a private key Ks1 unique to the electronic money storage apparatus, and an encrypted code Kp1*Ksg obtained by encrypting a public key Kp1 unique to the storage apparatus in accordance with a shared private key Ksg.

Similarly, the remittee is assigned with an electronic money storage apparatus which keeps a shared public key Kpg, a private key Ks2 unique to the electronic money storage apparatus, and an encrypted code Kp2*Ksg obtained by encrypting a public key Kp2 unique to the storage apparatus in accordance with the shared private key Ksg. In addition, an amount of electronic money is stored as amount information (numeric value) in each electronic storage apparatus.

Electronic money is moved or transferred between the electronic money storage apparatuses as follows.

The electronic money storage apparatus of the remitter transmits Kp1*Ksg, storage information encrypted by Ks1, and the like to the electronic money storage apparatus of the receiver.

The electronic money storage apparatus of the receiver defrosts or decomposes the received Kp1*Ksg by the shared public key Kpg to resultantly attain the public key Kp1 unique to the remitter's electronic money storage apparatus. Using the public key Kp1, the electronic money storage apparatus of the receiver obtains information such as storage information of the remitter's electronic money storage apparatus to thereby authenticate the remitter's electronic money storage apparatus.

Similarly, the remitter's electronic money storage apparatus authenticates the receiver's electronic money storage apparatus. Both electronic money storage apparatuses mutually authenticate each other in this way to share the respective public keys therebetween.

Thereafter, the remitter's electronic money storage apparatus subtracts an amount of remittance from an amount in an electronic money storage and then notifies an encrypted message of the reduction to the receiver's electronic money storage apparatus. On receiving the notification, the receivers storage apparatus adds the amount of remittance to its balance to thereby receive electronic money.

Subsequently, description will be given of electronic money of the token type.

For the token-type electronic money, data with an electronic signature of an electronic money issuer is treated as data representing a value.

Electronic money is issued in the following procedure.

A person who desires to issue electronic money sends a kind of random numbers obtained by conducting a type of transform on original random numbers, an amount to be issued, account information, and the like to an electronic money issuer.

The electronic money issuer confirms the amount requested and account information, writes its signature representing the requested amount for the received data of random numbers, and then returns the resultant data to the electronic money requester.

The electronic money requester conducts a certain kind of transform on the received data and then stores the data thus transformed in an electronic money storage. The stored data is called "token". As an example of the sequence of transform procedure, there exists "blind signature".

When electronic money is to be used, a token is moved from a remitter's electronic money storage apparatus to a receiver's electronic money storage apparatus. A method of subdivision of value and a method of checking duplicated usage have been described in detailed in the Article above and hence will not be described in this application.

Figure 3:
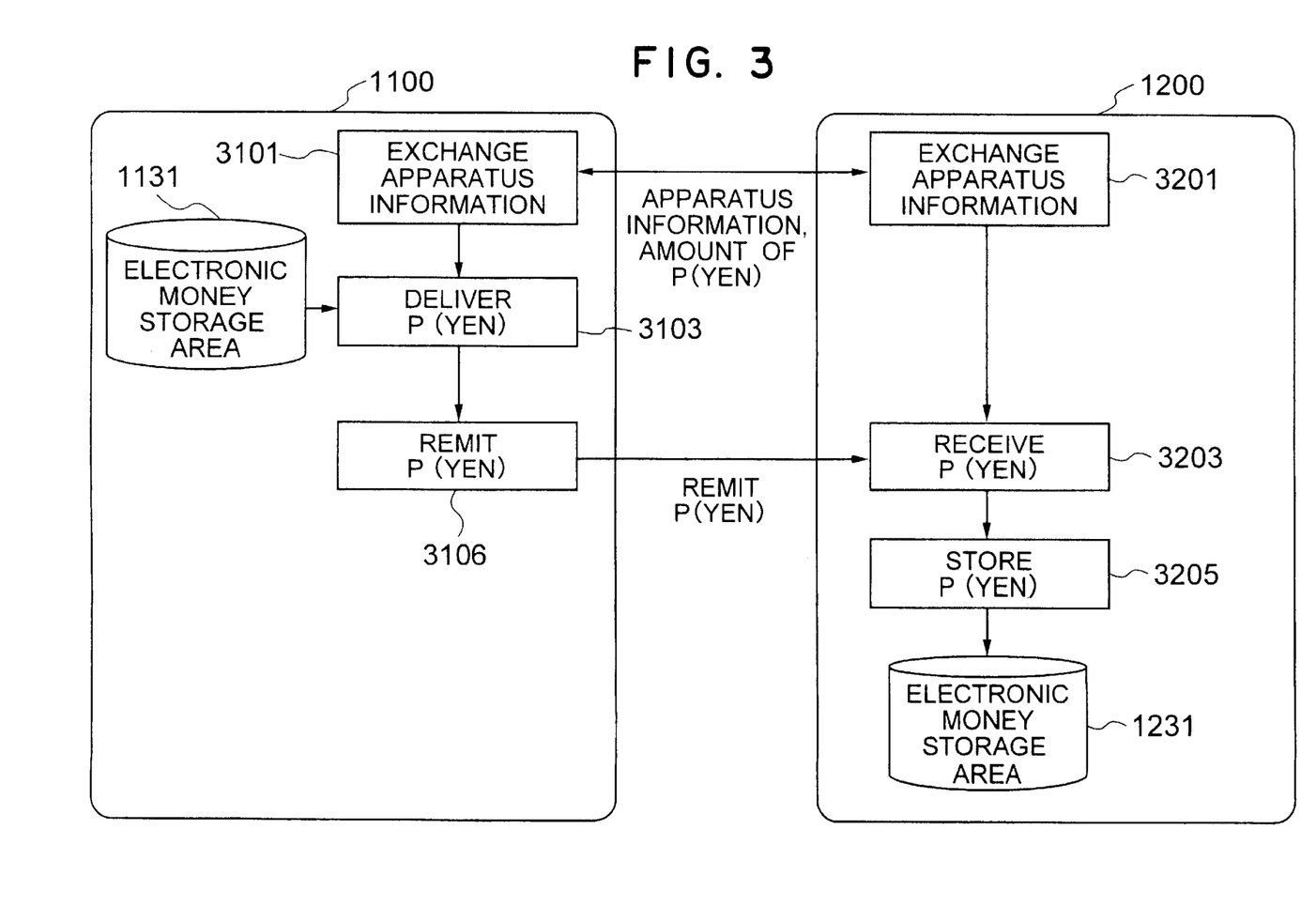
FIG. 3 is a flowchart showing a processing procedure in a conventional system in which electronic money is transferred between electronic money storage apparatuses.

The processing above can be summarized as shown in FIG. 3, which will be next described.

First, a remitter's electronic money storage apparatus 1100 and a receiver's electronic money storage apparatus 1200 communicate via a data transfer apparatus, not shown, information of respective storage apparatuses and a remittance amount therebetween (steps 3101 and 3201).

Next, the remittance amount p is attained from an electronic money storage area 1131 (step 3103).

Thereafter, the remitter's storage apparatus 1100 remits electronic money of an amount of p via a data transfer unit to the receiver's storage apparatus 1200 (step 3106).

The receiver's storage apparatus 1200 then receives the electronic money (step 3203) and then stores the amount of money p in an electronic money storage area 1231 (step 3205).

As the electronic money storage apparatus, there can be considered, for example, an IC card having an arithmetic processing function. As the data transfer unit, there exist, for example, a portable electronic money processing apparatus called "electronic wallet" and two computers connected to an IC card reader-writer via a communication line such as the Internet.

In addition to the electronic money of the IC card type, there exists, for example, electronic money of a network type described in pages 96 to 101 of "Scientific American", August 1992.

In the processing of the network-type electronic money, tokens are stored in a general storage such as a hard disk unit.

The processing ranging from the issuance of electronic money by an electronic money issuing institute or organization for the remitter to the transmission of the token from the remitter to the receiver, is the same as the token processing of the IC-card-type electronic money.

The receiver transmits the received token via a network to the electronic money issuing institute as a third person. The institute makes a check for validity of the token and presence or absence of an illegal use thereof.

However, in the processing of the conventional IC-card-type electronic money, the money remitting operation is carried out without any intervention of a third person and hence it is difficult for the electronic money issuer or the like to collect a transaction fee of electronic money.

Furthermore, in a processing system of, for example, the network-type electronic money in which an intervention of a third person takes place via a communication network or the like, it is always required to notify remittance information to a third person. Namely, this processing is possible only with a communication line, which disadvantageously leads to a problem of deterioration in usability of the processing system.

In the conventional methods described above, when the usability is emphasized for the persons related to remittance of money, the transaction fee cannot be collected; moreover, when the transaction fee is collected through communication, the usability is sacrificed.

SUMMARY OF THE INVENTION

It is therefore an object of the present invention to collect the transaction fee while retaining the usability and anonymity between the remitter and the receiver.

To achieve the object above, there is provided an electronic money processing method having a transaction fee collecting function in accordance with the present invention in which a first electronic storage apparatus of an electronic money remitting person (to be called a remitter herebelow) including communicating means, arithmetic means, and storage means for storing therein electronic money is connected via a data transfer unit to a second electronic storage apparatus of an electronic money receiving person (to be called a receiver herebelow) including communicating means, arithmetic means, and storage means for storing therein electronic money so as to transfer money therebetween.

The first electronic storage apparatus calculates an amount x of remitter's transaction fee and a transaction fee y to be stored in the first electronic storage apparatus, obtains an amount of p+x (p indicating an amount to be remitted) from the electronic money storage means of the first electronic money storage apparatus, divides the electronic money thus obtained into the amount of y calculated and an amount of p+x−y, stores y in the storage means, and transmits p+x−y via the data transfer unit to the second electronic money storage apparatus.

The second electronic storage apparatus calculates a transaction fee u to be stored in the second electronic money storage apparatus, receives the electronic money having the value of p+x−y, divides the electronic money thus received into the amount of u calculated and an amount of p+x−y−u, stores u in the storage means of the second electronic storage apparatus, and transmits p+x−y−u in the electronic money storage means of the second electronic money storage apparatus.

BRIEF DESCRIPTION OF THE DRAWINGS

The objects and features of the present invention will become more apparent from the consideration of the following detailed description taken in conjunction with the accompanying drawings in which.

DESCRIPTION OF THE PREFERRED EMBODIMENTS

Description will now be given in detail of an embodiment in accordance with the present invention.

Figure 1:
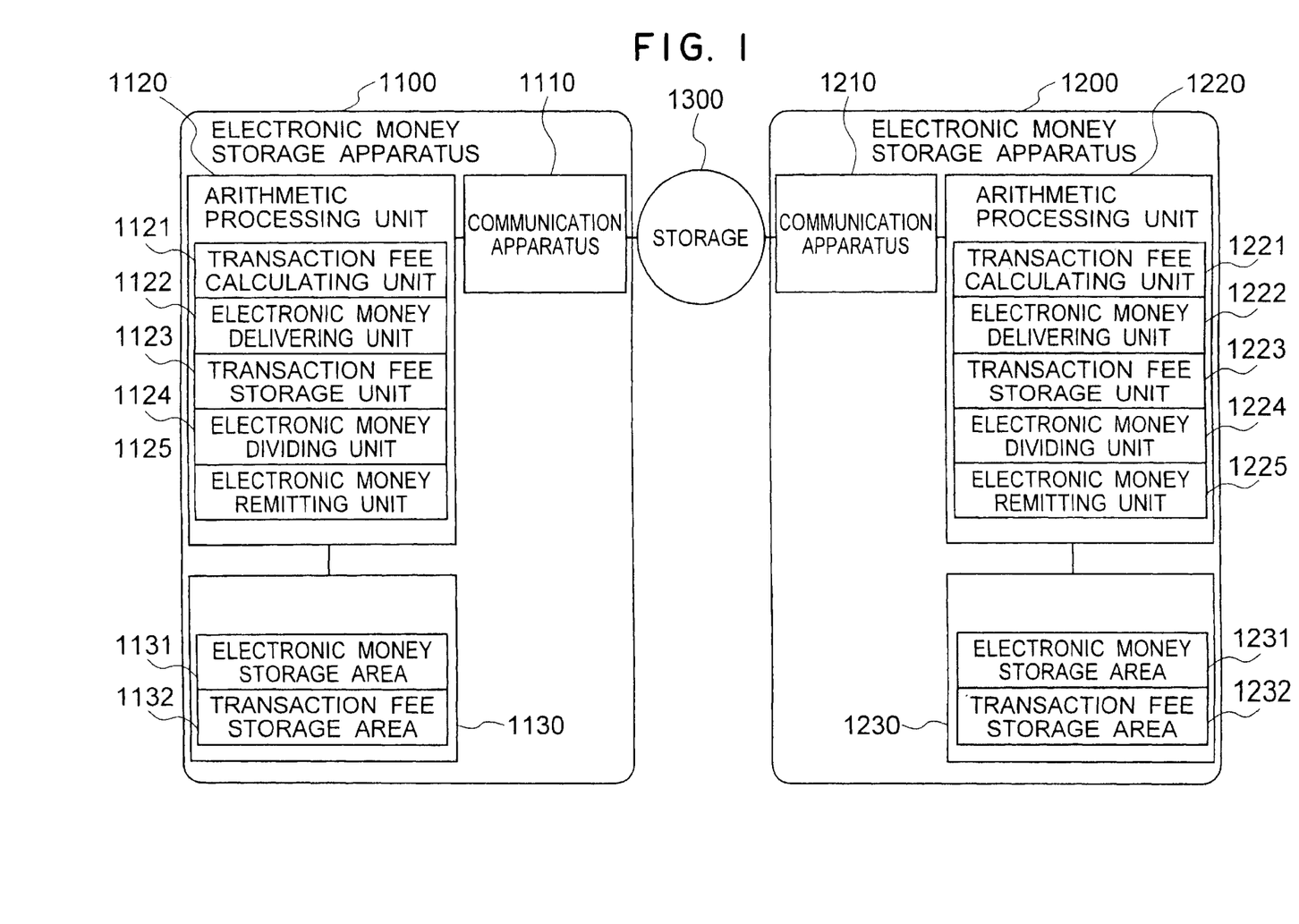
FIG. 1 is a schematic diagram showing a configuration of a system in which electronic money is transferred between electronic money storage apparatuses in accordance with the present invention.
Figure 2:
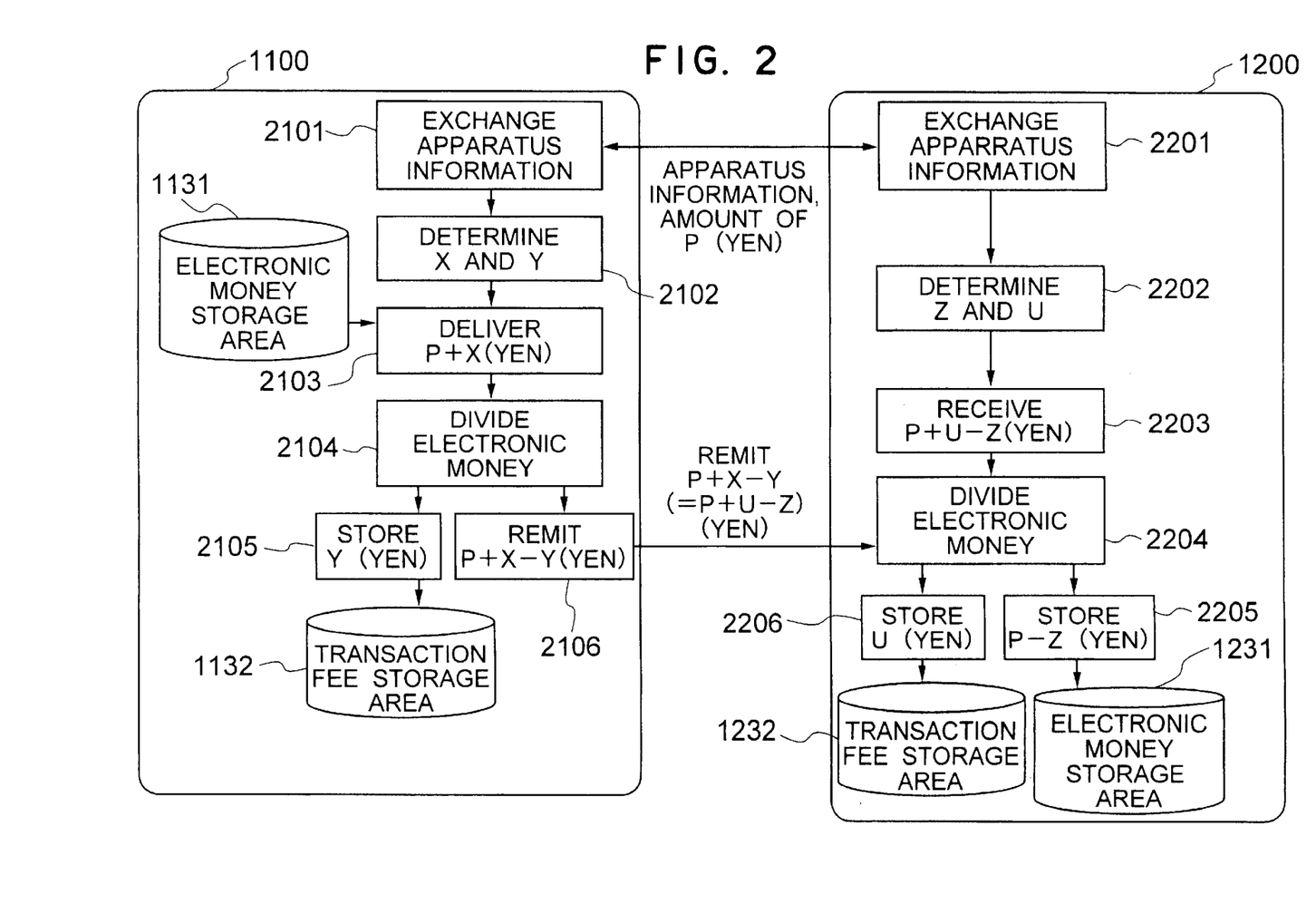
FIG. 2 is a flowchart showing a processing procedure in the system of FIG. 1.

FIG. 1 shows in a schematic diagram a configuration including electronic money storage apparatuses and a data transfer unit in accordance with the present invention. FIG. 2 shows in a flowchart processing executed in an embodiment of the present invention.

In FIG. 1, an electronic money storage apparatus 1100 of a person who transfers money (to be called a remitter herebelow) includes an arithmetic processing unit 1120 which conducts operations such as calculation of a transaction fee and encryption and a storage 1130 to store therein electronic money, encrypted keys, and the transaction fee.

The arithmetic processing unit 1120 includes a transaction fee calculating unit 1121, an electronic money delivering unit 1122, a transaction fee storage unit 1123, an electronic money dividing unit 1124, and an electronic money remitting unit 1125.

The storage 1130 includes an electronic money storage area 1131 to store therein electronic money and a transaction fee storage area 1132 to store therein a transaction fee.

The electronic money storage apparatus 1100 is connected via a communicating apparatus 1110 to a data transfer unit 1300. Electronic money is transmitted via the transfer unit 1300 to an electronic storage apparatus as a communication partner.

In addition, an electronic money storage apparatus 1200 of a person who receives money (to be called a receiver herebelow) includes, like the electronic money storage apparatus 1100, an arithmetic processing unit 1220 and a storage 1230 and is connected via a communication unit 1210 to the data transfer unit 1300.

The arithmetic processing unit 1220 includes a transaction fee calculating unit 1221, an electronic money storage unit 1222, a transaction fee storage unit 1223, an electronic money dividing unit 1224, and an electronic money receiving unit 1225.

Subsequently, operation of each section of FIG. 1 will be described by referring to the flowchart of FIG. 2.

First, the remitter's apparatus 1100 and the receiver's apparatus 1200 exchange via the data transfer unit 1300 apparatus information of each apparatus and a remittance amount of money p (steps 2101 and 2201).

Next, in accordance with the apparatus information, the remittance amount and time, and the like, the remitter's apparatus 1100 calculates, by the transaction fee calculating unit 1121, a transaction fee x for the remitter and an amount of money y to be stored in the transaction fee storage area 1132 of the remitter's apparatus 1100.

The amount of money y is a portion of the total of the transaction fee x for the remitter and a transaction fee z for the receiver, the portion being stored in the transaction fee storage area 1132 on the remitter side. Therefore, y may exceed x depending in some cases.

Each of the amounts x and y may be, for example, a fixed portion of the remittance amount or a fixed value for each remittance. These amounts x and y may be determined in various ways depending on cases. For example, when a person buys articles at a retailer, the retailer may be charged with these amounts. Alternatively, when money is transferred between private persons, these persons may be charged with an equal amount.

Thereafter, the electronic money delivering unit 1122 obtains, from the electronic money storage area 1131, a sum of remittance amount p and remitter's charge amount x, i.e., p+x (step 2103). The electronic money dividing unit 1124 divides the amount p+x into an amount y to be stored in the remitter's electronic money storage apparatus and an amount p+x−y to be sent to the receiver (step 2104). The transaction fee storage unit 1123 stores the amount y in the transaction fee storage area 1132 (step 2105).

In the storing step, the data to be stored may be appropriately modified only if the transaction fee can be restored therefrom. For example, if the transaction fee is of a fixed value, there may be stored the number of remitting operations.

Thereafter, in the remitter's electronic money storage apparatus 1100, the electronic money delivering unit 1125 transfers electronic money having a value of p+x−y to the receiver's apparatus 1200 via the communicating apparatus 1110 and the data transfer unit 1300, where p indicates the remittance amount and x represents the remitter's charge amount (step 2106).

In the operation above, steps 2105 and 2106 may be executed in a reversed sequence or at the same time. Moreover, the remittance of electronic money is completed through one communication in this example. However, in general, a plurality of messages are communicated between the remitter's and receiver's apparatuses 1100 and 1200 for encryption, authentication, confirmation of data reception, and the like.

In accordance with such information exchanged in step 2201 as apparatus information of the remitter's electronic money storage apparatus 1100, the remittance amount, and the remittance time, the receiver's apparatus 1200 calculates, by the transaction fee calculating unit 1221, the receiver's transaction fee z and an amount u to be stored in the transaction fee storage area 1232 of the receiver's apparatus 1200 (step 2202).

Since x−y is equal to u−z, it is not necessarily required to calculate the value of z.

Next, the receiver's apparatus 1200 receives, by the electronic money receiving unit 1225, electronic money via the communication apparatus 1210 (step 2203).

The reception of electronic money and calculations of z and u are carried out in an arbitrary order, namely, may be concurrently conducted. Alternatively, the transaction fee may be calculated after the reception of electronic money.

Subsequently, the electronic money dividing unit 1224 divides the received money into the amount u of transaction fee to be stored on the receiver side and an amount of p+x−y−u to be re-used as electronic money (step 2204) and then the transaction fee storage unit 1223 stores the amount u in the transaction fee storage area 1232 (step 2106).

In the storing operation, like the operation on the remitter side, the data to be stored may be appropriately stored only if the amount stored can be restored thereafter. For example, when the transaction fee is fixed, only the number of transfers may be stored as described above.

After the operation above, in the receiver's apparatus 1200, the electronic money storage unit 1222 stores an amount of p+x−y−u in the electronic money storage area 1231, where p+x−y indicates the received money and u is the receiver's transaction fee (step 2105).

In this connection, steps 2205 and 2206 may be executed in a reverse order or at the same time.

In the embodiment above, each of the remitter's and receiver's electronic money storage apparatuses includes a transaction fee collecting function. However, it may also be possible that an electronic money storage apparatus of a general consumer as a remitter does not include such a transaction fee collecting function and only an electronic money storage apparatus of a retailer as a receiver includes a transaction fee collecting function.

Figure 4:
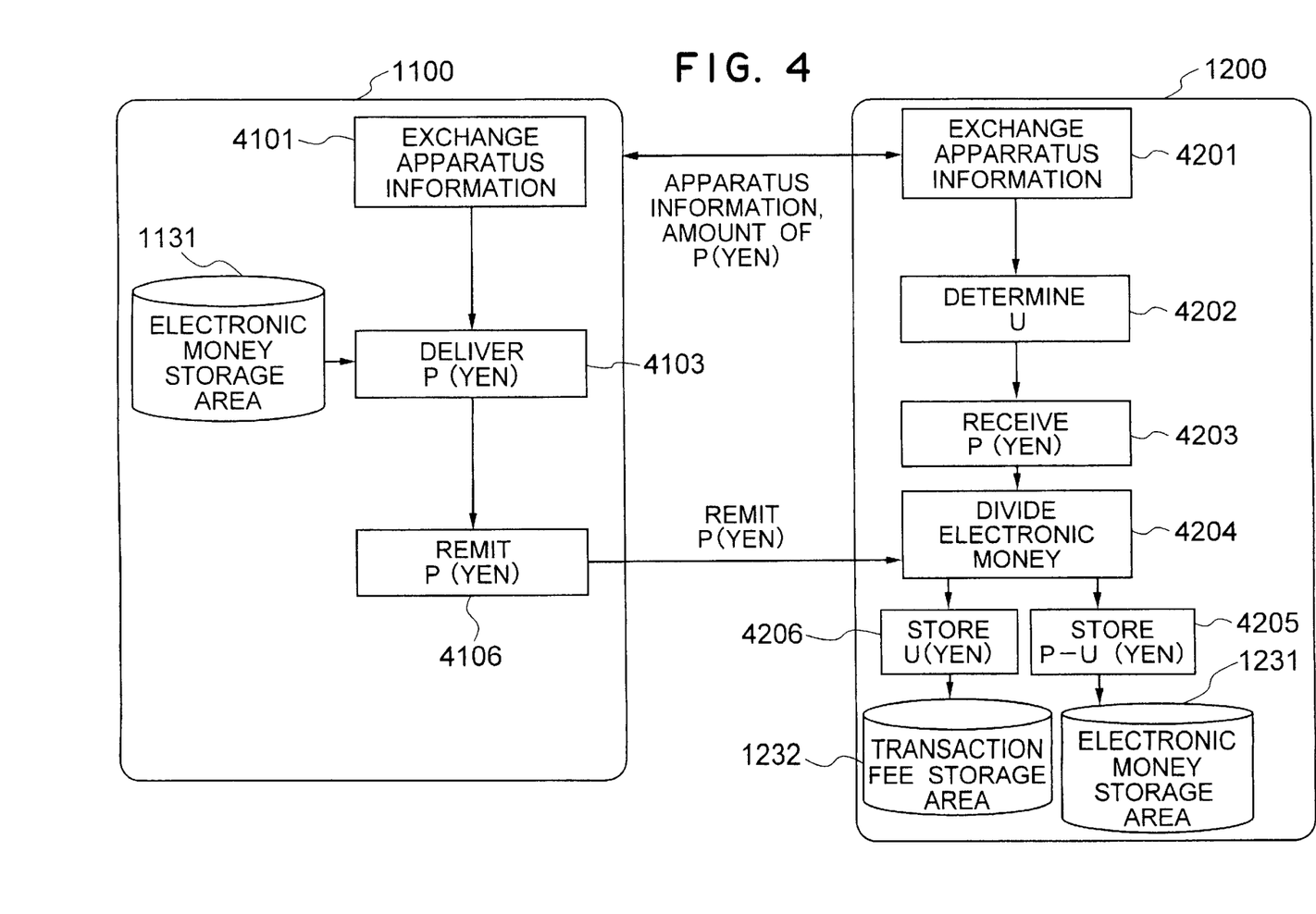
FIG. 4 is a flowchart showing a processing procedure in a system in which electronic money is transferred between remitter's and receiver's electronic money storage apparatuses, the remitter's electronic money storage apparatus not having a transaction charge collecting function.

Referring now to the flowchart of FIG. 4, description will be given of processing when the electronic money storage apparatus of a general consumer as a remitter does not include the transaction fee collecting function.

First, the remitter's electronic money storage apparatus 1100 and the receiver's electronic money storage apparatus 1200, exchange respective apparatus information and a remittance amount p via the data transfer unit 1300 (steps 4101 and 4201).

In the remitter's apparatus 1100, the electronic money delivering unit 1122 obtains a remittance amount p from the electronic money storage area 1131 and then the electronic money remitting unit 1125 transfers electronic money having the remittance amount p via the communication apparatus 1110 and the data transfer unit 1300 to the receiver's apparatus 1200 (step 4106).

In the receiver's apparatus 1200, the transaction fee calculating unit 1221 calculates a receiver's transaction fee u in accordance with such information exchanged as the apparatus information of the remitter's apparatus 1100 and the remittance amount and time (step 4202).

In the remitter's apparatus 1100 not having the transaction fee collecting function, the arithmetic processing unit 1120 may not include the transaction calculating unit 1121, the transaction fee storage unit 1123, and the electronic money dividing unit 1124, and the storage (1130) may not include the transaction fee storage area 1132.

Next, the receiver's apparatus 1200 receives, by the electronic money receiving unit 1225, electronic money via the communication unit 1210 (step 4203).

The reception of electronic money and the calculation of u may be carried out in any order. Namely, these operations may be concurrently accomplished, or the transaction fee may be calculated after the electronic money is received.

Subsequently, the electronic money dividing unit 1224 divides the received money into the amount u of transaction fee to be stored and an amount of p−u to be re-used as electronic money (step 4204) and then the transaction fee storage unit 1223 stores the amount u in the transaction fee storage area 1232 (step 4206).

After the operation above, in the receiver's apparatus 1200, the electronic money storage unit 1222 stores an amount of p−u in the electronic money storage area 1231, where p indicates the received money and u denotes the receiver's transaction fee (step 4205).

In this regard, steps 4205 and 4206 may be conducted in a reverse sequence or at the same time.

Through the procedure above, the transaction fee can be collected even when the electronic money storage apparatus 1100 on the remitter side does not include the transaction fee collecting function. In the example above, only the receiver is charged with the transaction fee. However, by substituting the remittance amount p for an amount of p+x including the receiver's transaction fee, the receiver is also charged with the transaction fee without any modification in the remitter's electronic money storage apparatus.

Moreover, in a case reverse to the case above, namely, even when the receiver's electronic money storage apparatus 1200 does not include the transaction fee collecting function, it is possible to collect the transaction fee.

Figure 5:
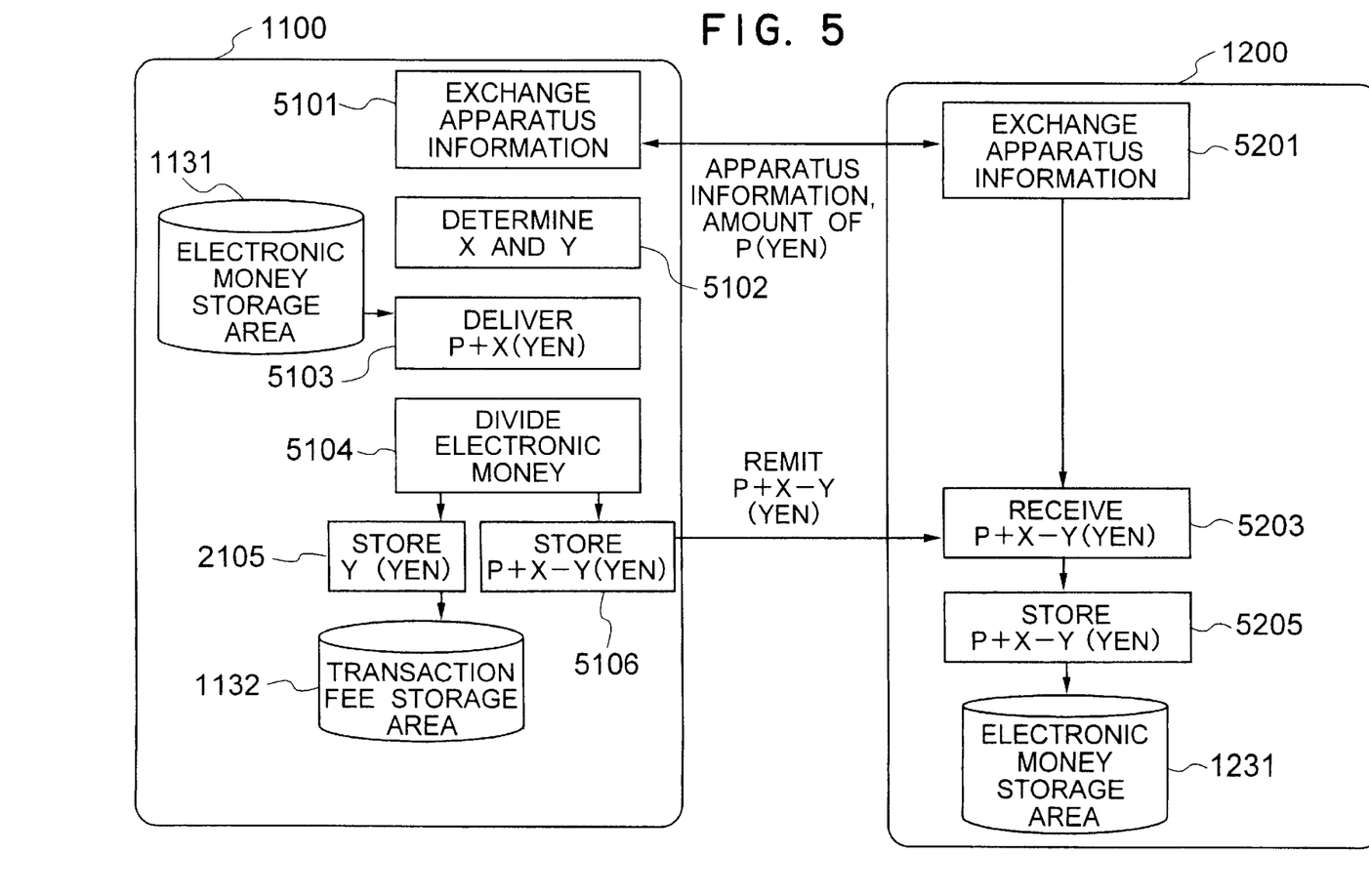
FIG. 5 is a flowchart showing a processing procedure in a system in which electronic money is transferred between remitter's and receiver's electronic money storage apparatuses, the receiver's electronic money storage apparatus not having a transaction charge collecting function.

Description will be given of processing of this case by mainly referring to FIG. 5.

First, the remitter's electronic money storage apparatus 1100 and the receiver's electronic money storage apparatus 1200 exchange apparatus information of the respective apparatuses and a remittance amount p via the data transfer unit 1300 (steps 5101 and 5201).

Next, in the remitter's apparatus 1100, the transaction fee calculating unit 1121 calculates the remitter's transaction fee x and the amount y to be stored in the transaction fee storage area 1132 of the remitter's apparatus 1100 in accordance with the apparatus information and the remittance amount and time.

The electronic money delivering unit 1122 thereafter obtains an amount of p+x from the electronic money storage area 1131, where p indicates the remittance amount and x represents the remitter's charge amount (step 5103). The electronic money dividing unit 1124 divides the received money into the amount y to be stored in the remitter's apparatus 1100 and an amount of p+x−y to be sent to the receiver (step 5104) and then the transaction fee storage unit 1123 stores the amount y in the transaction fee storage area 1132 (step 5105).

Thereafter, in the remitter's apparatus 1100, the electronic money delivering unit 1125 sends electronic money having a value of p+x−y via the communication apparatus 1110 and the data transfer unit 1300 to the receiver's apparatus 1200, where p indicates the amount to be remitted to the receiver's apparatus 1200, x denotes the remitter's charge amount, and y indicates the amount to be stored on the remitter aside (step 5106).

After the operation above, the receiver's apparatus 1200 receives, by the electronic money receiving unit 1225, the electronic money via the communication unit 1210 (step 5203) and then stores, by the electronic money storage unit 1222, the received amount p+x−y in the electronic money storage area 1231 (step 5205).

In the receiver's electronic money storage apparatus 1200, the arithmetic processing unit 1220 does not include the transaction fee collecting unit 1221, the transaction fee storage unit 1223, and the electronic money dividing unit 1224 and the storage 1230 does not include the transaction fee storage area 1232.

As above, even when only one of the communicating electronic money storage apparatuses includes the transaction fee collecting function, it is possible to appropriately collect the transaction fee.

Description will now be given of a method of collecting or gathering the transaction fee stored.

There may be considered various methods of collecting the transaction fee.

First, by using a function of an IC card, the electronic money stored as the transaction fee is written, for example, in a read inhibition area such that the electronic money cannot be used again. At an expiration date of the validity time of the IC card, the electronic money issuer collects the IC card to check the transaction fee.

Furthermore, in accordance with a method of controlling transfer of electronic money described in PP. 124–127 of "Illustrated Guide To 'Electronic Money'" of Financial System Promoting Division of Hitachi, Nikkan Kogyo Shimbun (June 1996), there may be used another method of collecting the transaction fee. Namely, the electronic money of the transaction fee can be transferred only to an electronic money issuer authorized for the collection of the transaction.

As described above, in accordance with the present invention, the transaction fee can be collected while retaining anonymity of the remitter and the receiver as well as while keeping usability, i.e., it is not required to connect the system via a communication unit to a third person for each remittance of electronic money.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

What is claimed is:

1. A system for transferring electronic money, comprising:
   a first electronic money storage apparatus on an electronic money remitting side including communicating means, arithmetic means, and memory means for storing therein electronic money;
   a second electronic money storage apparatus on an electronic money receiving side including communicating means, arithmetic means, and memory means for storing therein electronic money; and
   a data transfer unit for connecting the first electronic storage apparatus to the second electronic storage apparatus, wherein:
   the first electronic money storage apparatus calculates an amount x of remitter's transaction fee and a transaction fee y to be stored in the first electronic money storage apparatus, obtains an amount of p+x (p indicating an amount to be remitted) from the memory means of the first electronic money storage apparatus, divides the electronic money thus obtained into the amount of y calculated and an amount of p+x −y, stores y in the memory means, and transmits p+x −y via the data transfer unit to the second electronic money storage apparatus; and wherein
   the second electronic money storage apparatus calculates a transaction fee u to be stored in the second electronic money storage apparatus, receives the electronic money having the value of p+x−y, divides the electronic money thus received into the amount of u calculated and an amount of p+x−y−u, stores u in the memory means of the second electronic money storage apparatus, and transmits p+x−y−u in the memory means of the second electronic money storage apparatus.

2. An electronic money transferring system in accordance with claim 1, wherein the transaction fee stored in the memory means cannot be used again.

3. An electronic money transferring system in accordance with claim 1, wherein the transaction fee stored in the memory means can be transferred only to an electronic money storage apparatus authenticated for a right to collect the transaction fee.

4. A system for transferring electronic money, comprising:

a first electronic money storage apparatus on an electronic money remitting side including communicating means, arithmetic means, and memory means for storing therein electronic money;

a second electronic money storage apparatus on an electronic money receiving side including communicating means, arithmetic means, and memory means for storing therein electronic money; and a data transfer unit for connecting the first electronic money storage apparatus to the second electronic money storage apparatus, wherein the first electronic storage apparatus calculates an amount x of remitter's transaction fee and a transaction fee y to be stored in the first electronic storage apparatus, obtains an amount of p+x (p indicating an amount to be remitted) from the electronic money storage means of the first electronic money storage apparatus, divides the electronic money thus obtained into the amount of y calculated and an amount of p+x−y, stores y in the memory means, and transmits p+x−y via the data transfer unit to the second electronic money storage apparatus.

5. A system for transferring electronic money, comprising:

a first electronic money storage apparatus on an electronic money remitting side including communicating means, arithmetic means, and memory means for storing therein electronic money;

a second electronic money storage apparatus on an electronic money receiving side including communicating means, arithmetic means, and memory means for storing therein electronic money; and a data transfer unit for connecting the first electronic money storage apparatus to the second money electronic storage apparatus, wherein the second electronic money storage apparatus calculates a transaction fee u to be stored in the second electronic money storage apparatus, receives the electronic money having the value of p, divides the electronic money thus received into the amount of u calculated and an amount of p−u, stores u in the memory means of the second electronic storage apparatus, and transmits p−u in the electronic money storage means of the second electronic money storage apparatus.

6. An electronic money processing method for use with an electronic money storage apparatus, comprising the following steps of:

calculating an amount x of remitter's transaction fee and a transaction fee y;

obtaining an amount of p+x (p indicating an amount to be remitted;

dividing the electronic money thus obtained into the amount of y calculated and an amount of p+x −y;

storing y in memory means; and transmitting p+x−y via a data transfer unit to a destination of remittance.

7. An electronic money processing method for use with an electronic money storage apparatus, comprising the following steps of:

calculating a transaction fee u;

receiving the electronic money having the value of p transmitted from a source of remittance;

dividing the electronic money thus received into the amount of u calculated and an amount of p−u;

storing u in memory means; and storing p−u in the memory means.

8. An electronic storage apparatus including communicating means, arithmetic means, and memory means for storing therein electronic money, comprising:

means for calculating an amount remitter's transaction fee and a transaction fee to be stored in the electronic storage apparatus;

means for obtaining electronic money having an amount including an amount to be remitted and the remitter's transaction fee from the electronic money storage means;

means for dividing the electronic money thus obtained into the amount to be remitted and the amount of transaction fee to be stored;

means for storing in the storage means electronic money of the transaction fee to be stored; and means for transmitting electronic money having an amount obtained by subtracting the transaction fee from the electronic money obtained.

9. An electronic storage apparatus including communicating means, arithmetic means, and memory means for storing therein electronic money, comprising:

means for calculating in accordance with electronic money received an amount to be stored as a transaction fee;

means for dividing the electronic money thus received into the amount to be stored as the transaction fee and an amount to be re-used as electronic money;

means for storing the amount of transaction fee in the memory means; and means for storing in the electronic money storage means the electronic money received excepting the electronic money stored as the transaction fee.

* * * * *